United States Patent
Lopez et al.

(10) Patent No.: US 10,771,916 B2
(45) Date of Patent: Sep. 8, 2020

(54) DETERMINING A POSITION OF A WIRELESS DEVICE

(71) Applicant: Telefonaktiebolaget LM Ericsson (publ), Stockholm (SE)

(72) Inventors: Miguel Lopez, Solna (SE); Benny Lennartson, Hägersten (SE); Krister Sundberg, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 96 days.

(21) Appl. No.: 15/503,832

(22) PCT Filed: Sep. 10, 2014

(86) PCT No.: PCT/SE2014/051043
§ 371 (c)(1),
(2) Date: Feb. 14, 2017

(87) PCT Pub. No.: WO2016/039675
PCT Pub. Date: Mar. 17, 2016

(65) Prior Publication Data
US 2017/0245102 A1    Aug. 24, 2017

(51) Int. Cl.
*H04W 4/02* (2018.01)
*G01S 5/02* (2010.01)
(Continued)

(52) U.S. Cl.
CPC ............. *H04W 4/02* (2013.01); *G01S 5/0252* (2013.01); *H04B 17/327* (2015.01);
(Continued)

(58) Field of Classification Search
CPC ..... H04W 4/02; H04W 24/08; H04W 72/042; H04B 17/327; H04B 17/336; G01S 5/0252
See application file for complete search history.

(56) References Cited

U.S. PATENT DOCUMENTS 6,259,924 B1 * 7/2001 Alexander, Jr. ............ G01S 5/02
  455/456.2
6,438,381 B1 * 8/2002 Alberth, Jr. ............... G01S 5/02
  342/357.74
(Continued)

FOREIGN PATENT DOCUMENTS

WO    2012116007 A1    8/2012

OTHER PUBLICATIONS

Google Scholar Search Results.*

*Primary Examiner* — Qun Shen
(74) *Attorney, Agent, or Firm* — Coats & Bennett, PLLC

(57) ABSTRACT

It is presented a method for determining a position of a wireless device within a single radio cell served by a plurality of remote radio heads. The method is performed in a position determination node and comprises the steps of: receiving a measured power signature comprising at least two, in time separated, power measurement values of a downlink signal, the measured power signature originating from the wireless device; comparing the measured power signature with a set of reference power signatures, wherein each one of the plurality of remote radio heads is associated with a reference power signature and the reference power signatures differ for at least two of the plurality of remote radio heads; and determining a position in that the wireless device is in the vicinity of one of the at least one remote radio head whose reference power signature best matches the measured power signature.

27 Claims, 3 Drawing Sheets

(51) Int. Cl.
  *H04W 64/00* (2009.01)
  *H04B 17/327* (2015.01)
  *H04B 17/336* (2015.01)
  *H04W 24/08* (2009.01)
  *H04W 72/04* (2009.01)
  *H04W 88/08* (2009.01)

(52) U.S. Cl.
  CPC .......... *H04B 17/336* (2015.01); *H04W 24/08* (2013.01); *H04W 64/00* (2013.01); *H04W 72/042* (2013.01); *H04W 88/085* (2013.01)

(56) References Cited

U.S. PATENT DOCUMENTS

| | | | |
|---|---|---|---|
| 9,374,677 B2 * | 6/2016 | Tarlazzi | H04W 4/04 |
| 9,632,169 B2 * | 4/2017 | Moraleda | G01S 5/0294 |
| 2010/0232543 A1 * | 9/2010 | Sampath | G01S 1/042 |
| | | | 375/295 |
| 2011/0230144 A1 | 9/2011 | Siomina et al. | |
| 2012/0064904 A1 * | 3/2012 | Lee | H04W 72/082 |
| | | | 455/450 |
| 2012/0149392 A1 * | 6/2012 | Siomina | H04W 64/00 |
| | | | 455/456.1 |
| 2012/0184287 A1 * | 7/2012 | Jovicic | G01S 5/0009 |
| | | | 455/456.1 |
| 2013/0051317 A1 * | 2/2013 | Ji | H04W 72/0446 |
| | | | 370/328 |
| 2015/0055518 A1 * | 2/2015 | Park | H04B 7/2643 |
| | | | 370/280 |
| 2015/0351058 A1 * | 12/2015 | Seo | H04W 56/0025 |
| | | | 370/350 |

\* cited by examiner

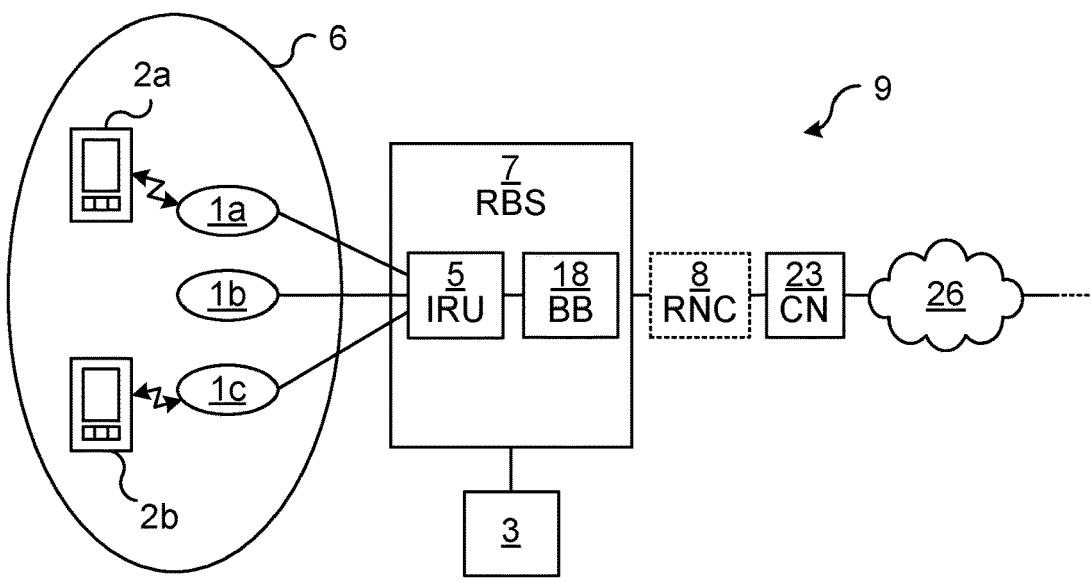
Fig. 1
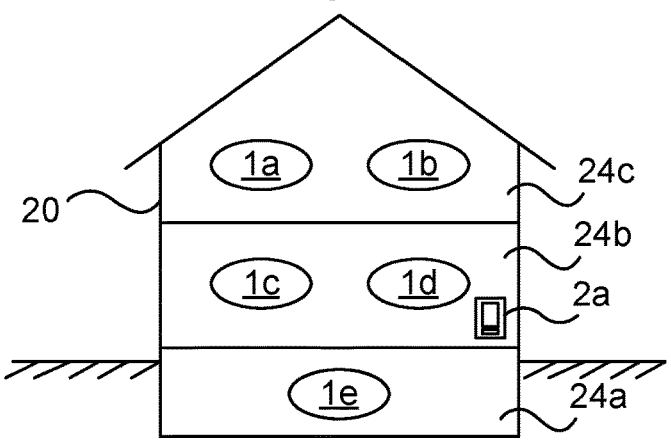
Fig. 2
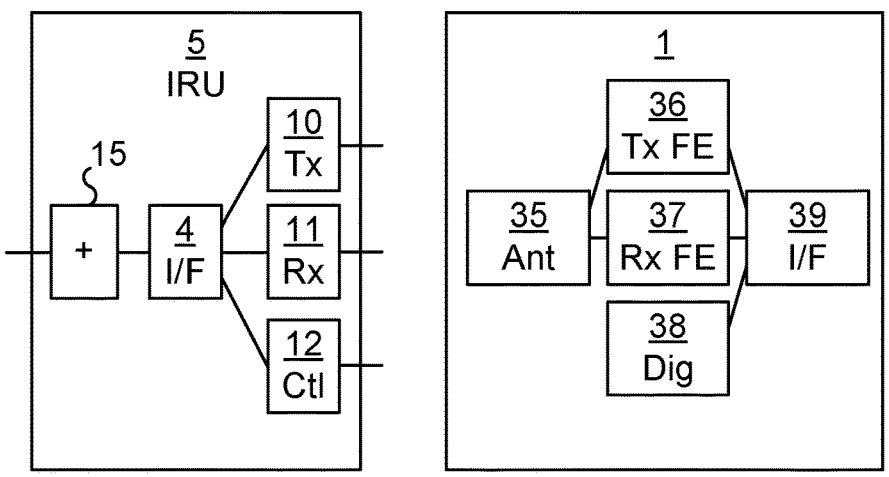
Fig. 3
Fig. 4

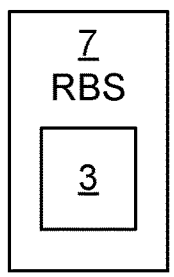
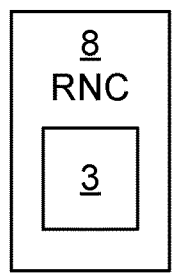
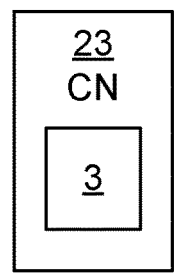
Fig. 7A   Fig. 7B   Fig. 7C
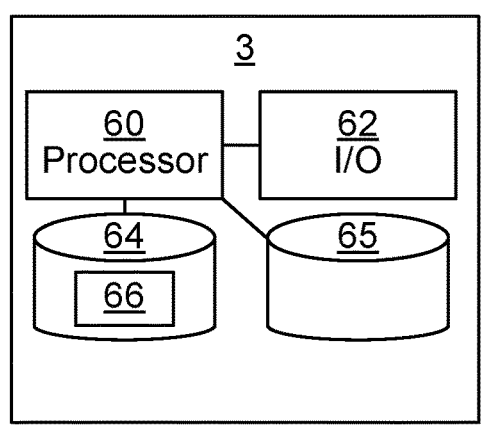
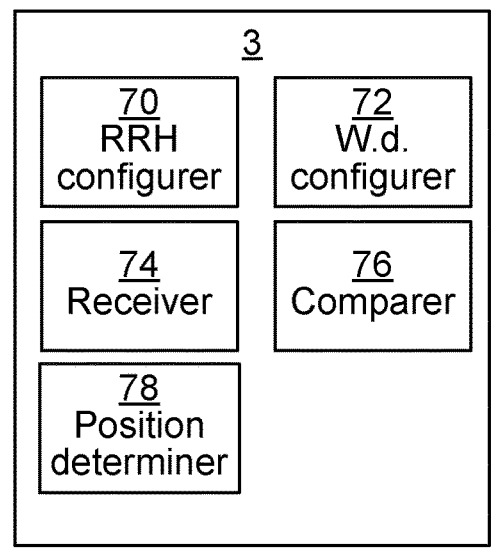
Fig. 8   Fig. 9
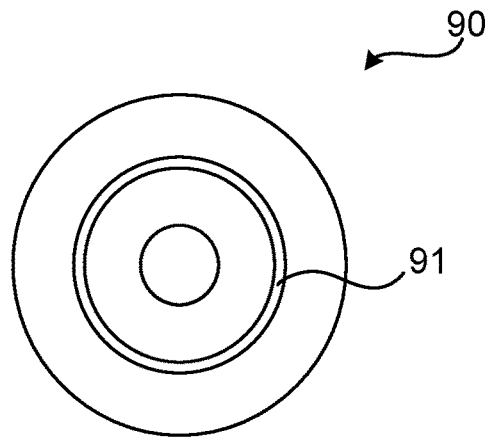
Fig. 10

DETERMINING A POSITION OF A WIRELESS DEVICE

TECHNICAL FIELD

The invention relates to a method, position determination nodes, computer program, and computer program product for determining a position of a wireless device.

BACKGROUND

When deploying wireless communication networks, there is a balance between coverage and capacity. On the one hand, a few large cells can provide great coverage but at a cost of reduced capacity. On the other hand, a scenario with many small cells creates better capacity and throughput, but may not provide the desired coverage. Hence, there is often a combination of larger cells to provide sufficient coverage with smaller cells to provide better capacity.

However, when the cells get too small, wireless terminals moving in the network cause a great number of handovers which causes significant overhead. Moreover, providing coverage indoors using many small cells can be quite costly, with a radio base station for each such small cell.

One solution to this problem is to use remote radio heads, where several remote radio heads connected to the same radio base station share the same cell. In this way, a single radio base station can provide coverage in different parts of the building by placing the remote radio heads appropriately. Moreover, the wireless device can move between the coverage of different remote radio heads while staying within the same cell, thus avoiding causing handovers. The wireless device will not realize that it is served by different remote radio heads, but see it as one single cell.

However, since only one cell is spanned by multiple remote radio heads, the granularity of location determination of a wireless device by cell identification is quite large. This leads to insufficient positioning accuracy in locating wireless devices, leading to issues in complying with increased accuracy of positioning requirements for emergency calls such as those specified in Enhanced-911 (E911) by FCC CSRIC (Federal Communication Commission Communication, Security, Reliability, Interoperability Council). Moreover, since the remote radio heads are often deployed indoors, satellite based positioning such as GPS (Global Positioning System) is often unavailable.

SUMMARY

It is an object to provide a way to determine a position of a wireless device within a single radio cell served by a plurality of remote radio heads.

According to a first aspect, it is presented a method for determining a position of a wireless device within a single radio cell served by a plurality of remote radio heads. The method is performed in a position determination node and comprises the steps of: receiving a measured power signature comprising at least two, in time separated, power measurement values of a downlink signal, the measured power signature originating from the wireless device; comparing the measured power signature with a set of reference power signatures, wherein each one of the plurality of remote radio heads is associated with a reference power signature and the reference power signatures differ for at least two of the plurality of remote radio heads; and determining a position in that the wireless device is in the vicinity of one of the at least one remote radio head whose reference power signature best matches the measured power signature. In this way, the position of the wireless device can be determined based on the measurements of the downlink signals, where remote radio heads have different reference power signatures, even though the remote radio heads are of the same radio cell. Moreover, these measurements can be received in conventional measurement reports from the wireless device, whereby the wireless device does not need to be modified in any way for this method to work.

The reference power signatures may differ for each one of the plurality of remote radio heads.

Each reference power signature may be the same for at least two remote radio heads in the same area.

In the step of receiving a measured power signature, each measurement may be based on a signal to noise and interference ratio.

In the step of receiving a measured power signature, each measurement may be based on a measurement of received quality and/or power of a reference signal, in which case each reference power signature defines transmission power for a corresponding reference signal.

In the step of receiving a measured power signature, each measurement may be based on a measurement of power of data symbols, in which case each reference power signature defines transmission power for corresponding data symbols.

In the step of receiving a measured power signature, each measurement may be based on a total received wideband power observed by the wireless device from all sources.

In the step of receiving a measured power signature, the downlink signal may be a downlink pilot signal.

In the step of receiving a measured power signature, each measurement may be based on a received signal code power.

The reference power signatures may be orthogonal to each other.

The step of determining a position may comprise determining that the wireless device is in the vicinity of two specific remote radio heads by considering contributions from of a plurality of reference power signatures to the measured power signature.

The method may further comprise the step of: configuring each one of the plurality of remote radio heads to use a reference power signature.

The method may further comprise the step of: configuring the wireless device to periodically transmit the power measurement values of the downlink signal.

According to a second aspect, it is presented a position determination node for determining a position of a wireless device within a single radio cell served by a plurality of remote radio heads. The position determination node comprises: a processor; and a memory storing instructions that, when executed by the processor, causes the position determination node to: receive a measured power signature comprising at least two, in time separated, power measurement values of a downlink signal, the measured power signature originating from the wireless device; compare the measured power signature with a set of reference power signatures, wherein each one of the plurality of remote radio heads is associated with a reference power signature and the reference power signatures differ for at least two of the plurality of remote radio heads; and determine a position in that the wireless device is in the vicinity of one of the at least one remote radio head whose reference power signature best matches the measured power signature.

The reference power signatures may differ for each one of the plurality of remote radio heads.

Each reference power signature may be the same for at least two remote radio heads in the same area.

Each measurement may be based on a signal to noise and interference ratio.

Each measurement may be based on a measurement of received quality and/or power of a reference signal, in which case each reference power signature defines transmission power for a corresponding reference signal.

Each measurement may be based on a measurement of power of data symbols and in which case each reference power signature defines transmission power for corresponding data symbols.

Each measurement may be based on a total received wideband power observed by the wireless device from all sources.

The downlink signal may be a downlink pilot signal.

Each measurement may be based on a received signal code power.

The reference power signatures may be orthogonal to each other.

The instructions to determine a position may comprise instructions that, when executed by the processor, causes the position determination node to determine that the wireless device is in the vicinity of two specific remote radio heads by considering contributions from of a plurality of reference power signatures to the measured power signature.

The position determination node may further comprise instructions that, when executed by the processor, causes the position determination node to configure each one of the plurality of remote radio heads to use a reference power signature.

The position determination node may further comprise instructions that, when executed by the processor, causes the position determination node to: configure the wireless device to periodically transmit the power measurement values of the downlink signal.

According to a third aspect, it is presented a position determination node comprising: means for receiving a measured power signature comprising at least two, in time separated, power measurement values of a downlink signal, the measured power signature originating from the wireless device; means for comparing the measured power signature with a set of reference power signatures, wherein each one of a plurality of remote radio heads serving a single radio cell is associated with a reference power signature and the reference power signatures differ for at least two of the plurality of remote radio heads; and means for determining a position in that the wireless device is in the vicinity of one of the at least one remote radio head whose reference power signature best matches the measured power signature.

According to a fourth aspect, it is presented a computer program for a position determination node determining a position of a wireless device within a single radio cell served by a plurality of remote radio heads. The computer program comprises computer program code which, when run on the position determination node causes the position determination node to: receive a measured power signature comprising at least two, in time separated, power measurement values of a downlink signal, the measured power signature originating from the wireless device; compare the measured power signature with a set of reference power signatures, wherein each one of the plurality of remote radio heads is associated with a reference power signature and the reference power signatures differ for at least two of the plurality of remote radio heads; and determine a position in that the wireless device is in the vicinity of one of the at least one remote radio head whose reference power signature best matches the measured power signature.

According to a fifth aspect, it is presented a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 1 is a schematic architecture diagram illustrating an environment where embodiments presented herein can be applied;

FIG. 2 is a schematic diagram illustrating an example deployment of remote radio heads of FIG. 1 in a multi-story building;

FIG. 3 is a schematic diagram illustrating components of an embodiment of an indoor radio unit of FIG. 1;

FIG. 4 is a schematic architecture diagram illustrating components of an embodiment of a remote radio head of FIG. 1;

FIGS. 7A-C are schematic diagrams illustrating alternative embodiments of the position determination node of FIG. 1;

FIG. 8 is a schematic diagram showing some components of an embodiment of the position determination node of FIG. 1 or FIGS. 7A-C;

FIG. 9 is a schematic diagram showing functional modules of the software instructions of the position determination node of FIG. 1, FIGS. 7A-C or FIG. 8 according to one embodiment; and FIG. 10 shows one example of a computer program product comprising computer readable means.

DETAILED DESCRIPTION

Figure 5A:
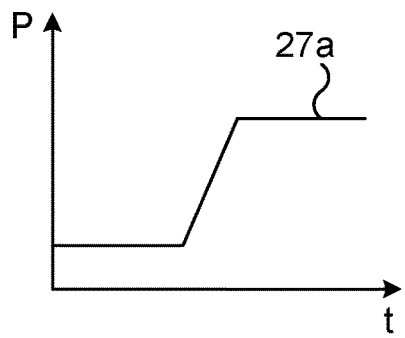
FIGS. 5A-D are schematic graphs illustrating various reference power signatures.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIG. 1 is a schematic architecture diagram illustrating an environment where embodiments presented herein can be applied. A wireless communication network 9 comprises a number of remote radio heads 1a-c for installation in locations where traditional deployment with antennas being co-located with the radio base stations is not ideal. For example, the wireless communication network 9 can be installed indoors, such as in an office, shopping centre, train station or airport.

It is to be noted that, while the embodiments presented herein are described as implemented using LTE (Long Term Evolution) and/or W-CDMA (Wideband Code Division Multiplex), any applicable communication standard may be used, such as any one or a combination of LTE-SAE (Long Term Evolution-System Architecture Evolution), GSM (Global System for Mobile communication), EDGE (Enhanced Data Rates for GSM Evolution), GPRS (General Packet Radio Service), CDMA2000 (Code Division Multiple Access 2000), or any other current or future wireless network, such as LTE-Advanced, as long as the principles described hereinafter are applicable.

A radio base station 7 here comprises a baseband module 18 and an indoor radio unit (IRU) 5. It is to be noted though, despite the name, that the IRU may also be provide outside whenever appropriate. The IRU 5 is in turn connected to, and is a link for, a number (in this example three) remote radio heads 1*a-c* via respective cables. In this way, the radio base station 7 is a link for uplink and downlink communication for the remote radio heads connected to the IRU 5.

It is to be noted that the IRU 5 can form part of the radio base station 7 as shown in FIG. 1, but the IRU 5 can also be provided separate from, but connected to, the radio base station 7.

The radio base station 7 is also connected to a core network 23, optionally via a radio network controller (RNC) 8. The RNC 8 is e.g. be used in W-CDMA networks to control one or more radio base stations (node Bs in such a case). The core network 23 provides central functions and connectivity to external networks 26 such as the Internet and/or POTS (Plain Old Telephone Service).

The remote radio heads 1*a-c* connected to the IRU 5 are part of a single radio cell 6 and thus share a cell identifier. Antennas do not need to be included in this embodiment of the radio base station 7 or the IRU 5, as the remote radio heads 1*a-c* provide the antennas for the wireless link to one or more wireless devices 2*a-b*. The wireless link provided by the remote radio heads 1*a-c* includes both downlink (DL) communication to the wireless devices 2*a-b* and uplink (UL) communication from the wireless devices 2*a-b*. The term wireless device is also known as mobile communication terminal, user equipment (UE), station (STA), mobile terminal, user terminal, user agent, machine-to-machine devices etc., and can be, for example, what today is commonly known as a mobile phone or a tablet/laptop with wireless connectivity or fixed mounted terminal.

In radio communication systems, the data is transmitted and received over the air at a specific radio frequency—either the same for transmission and reception or on separate frequencies. This is often called the radio frequency (RF) or the carrier frequency.

There are many different carrier frequencies, depending on regional spectrum allocation and spectrum license rights. To create a common radio implementation supporting this variety of carrier frequencies, a second set of frequencies is used herein, denoted the Intermediate Frequency (IF), which is used for communication on the cables between the IRU 5 and the remote radio heads 1*a-c*.

It is to be noted that the processing of uplink and downlink signals in the IRU and the remote radio heads 1*a-c* do not need to occur in the digital domain and can be (but do not need to be) performed completely in the analogue domain.

The remote radio heads 1*a-c* convert from IF to RF for downlink transmission and from RF to IF for uplink reception. Conversely, the IRU converts from digital BB to IF for downlink transmission and from IF to digital BB for uplink reception.

By using IF instead of RF over the cables between the IRU 5 and the remote radio heads 1*a-c*, cheaper, widely deployed electrical cables can be used, such as Ethernet LAN cabling. In this way, existing indoor cabling can many times be reused during installation, which significantly saves cost, installation time and complexity. Optionally, the remote radio heads 1*a-c* are also powered over the respective cables.

The transmission and reception is under the control of the MAC (Media Access Control) scheduler in the baseband module 18. The MAC scheduler informs what transmissions should be made and informs, via the downlink signaling, the wireless devices when to transmit and on which frequency and power.

It is to be noted that, although FIG. 1 shows the baseband module 18 connected to one IRU 5, each baseband module 18 can be connected to several IRUs. Each IRU may have its own cell or several IRUs may share a single cell.

It is to be noted that while the embodiment of FIG. 1 shows three remote radio heads 1*a-c*, there may be fewer or more remote radio heads connected to each IRU 5.

A position determination node 3 is here connected to the radio base station 7. The position determination node can also be provided elsewhere (see e.g. FIG. 7A-C and description below). The position determination node 3 is used to determine a position of one or more wireless devices which are located in an area served by a remote radio head which is part of the shared radio cell 6. More particularly, the position determination node can determine the position of a wireless device with smaller granularity than the shared radio cell 6 as is described in more detail below.

FIG. 2 is a schematic diagram illustrating an example deployment of remote radio heads in a multi-story building 20. The building 20 here has a basement 24*a*, a ground floor 24*b* and a first floor 24*c*. On the first floor, there is a first remote radio head 1*a* and a second remote radio head 1*b*. On the ground floor, there is a third remote radio head 1*c* and a fourth remote radio head 1*d*. In the basement 1*e*, there is only a fifth remote radio head 1*e*.

In this example, all remote radio heads 1*a-e* have the same cell identifier and thus are part of a single radio cell.

In the prior art, it is very complicated to position the wireless device 2*a* within the single radio cell, particularly in a multi-story building. As is explained in more detail below, the inventors have realised that by assigning different reference power signatures to the remote radio heads and analysing corresponding measurement reports from the wireless device, it can be seen which remote radio head(s) the wireless device is close to. Each remote radio head can be assigned a different reference power signature to allow positioning to the nearest remote radio head. Alternatively, some remote radio heads share the same reference power signature. For instance, the remote radio heads on the same floor can share the same reference power signature to allow positioning of a wireless device to a particular floor of a multi-story building. In the example of FIG. 2, such an embodiment would imply that the first and second remote radio heads 1*a-b* share one reference power signature and the third and fourth remote radio heads 1*c-d* share one reference power signature.

FIG. 3 is a schematic diagram illustrating components of an embodiment of an IRU of FIG. 1. The IRU and its components will now be explained in a context of uplink and downlink communication using a remote radio head.

For uplink communication, the remote radio heads downconvert a received (uplink) signal to IF and send it over its cable to the IRU 5. The received IF signals from several remote radio heads are combined in a combiner 15 and fed to an interface circuitry 4. The interface circuitry 4 extracts the received IF signal from the interface and forwards it to the RX (reception) back-end 11. In one embodiment, the RX backend 11 comprises an analogue to digital (A/D) converter which samples the signal on IF and converts to a digital signal. In another embodiment, the RX back-end 11 first downconverts the received signals from IF to an analogue BB (baseband) signal which is further filtered and converter to a digital signal in an analogue to digital converter. The RX back-end 11 sends the combined received signals in digital form to the baseband module for further processing such as demodulation, decoding, etc. as known in the art per se.

For downlink communication, the process works in reverse to the uplink. Hence, the baseband module sends a digital BB signal for transmission to a TX (transmission) back-end 10 of the IRU 5. In one embodiment, the TX back-end 10 converts the digital BB signal to an analogue signal in IF directly in a digital to analogue (D/A) converter. In another embodiment, the TX back-end 10 pulse first converts the digital BB signal to an analogue transmission signal and upconverts the transmission signal to IF in the analogue domain. The transmission signal in IF is then inserted onto the interface by the interface circuitry 4, and provided to the combiner 15 which also functions as a splitter, providing the same transmission signal in IF to all connected remote radio heads over the respective cables. The remote radio heads then upconvert the IF signal to RF and transmit the RF signal over the air to the wireless devices 2a-b.

Moreover, there is a control link between a processor 12 in the IRU 5 and each remote radio head. This control link can be used e.g. to configure the reference power signature to be used in each remote radio head.

FIG. 4 is a schematic architecture diagram illustrating components of an embodiment of a remote radio head of FIG. 1, here represented by a single remote radio head 1. The remote radio head comprises an interface circuitry 39, a transmission front-end 36, a reception front-end 37, a digital unit 38 and an antenna device 35. It is to be noted that the antenna device 35 may comprise any number of antenna, e.g. one, two, four, six, eight, etc. When two or more antennas are used, MIMO (Multiple Input Multiple Output) can be employed. It should also be noted that a remote radio head may also support TDD/FDD operation and multi-band operation.

In line with what is explained above, the RX Front End 37 downconverts received signals in RF to IF for transfer over the cable to the IRU 5. Moreover, the TX Front End 36 upconverts transmission signals from IF, as received over the cable from the IRU 5 to RF for transmission to wireless devices.

The antenna device 35 may comprise one or more antenna elements for each antenna. Particularly, the antenna can comprise one or more antenna elements in a first polarisation and one or more antenna elements in a second polarisation to achieve an additional dimension of orthogonality. The two polarisations may be controlled separately. The antenna device 35 may also comprise appropriate filters to filter out unwanted signals.

The interface circuitry 39 inserts and extracts (multiplexes and demultiplexes) the transmission IF signal, the received IF signal and the control signal onto/from the cable. The interface circuitry 39 may use different frequency bands for uplink signals, downlink signals and control signals to thereby multiplex all of these on a single cable.

A digital unit 38 communicates with the processor 12 of the IRU. For example, the digital unit 38 may be used to receive commands from the processor 12 to use a specific reference power signature for downlink transmissions to allow positioning of a wireless device as described herein. The digital unit 38 can be implemented using software instructions such as a computer program executed by a processor and/or using only hardware, such as application specific integrated circuits, field programmable gate arrays, discrete logical components, etc.

Optionally, the remote radio head is connected to the radio base station via digital transmissions (not shown). In such a case, the remote radio head performs analogue to digital conversion, and vice versa, as well as downconversion/upconversion of the analogue signals from/to RF for reception and transmission from/to the wireless devices. The digital signal between IRU and radio head may be CPRI (Common Public Radio Interface) signal. In this case, the radio head performs the conversion between CPRI signal and RF signal.

FIGS. 5A-D are schematic graphs illustrating various reference power signatures. In the graph, the horizontal axis represents time and the vertical axis represents power.

In FIG. 5A, a first reference power signature 27a is shown where the power goes from a low level to a high level.

Figure 5B:
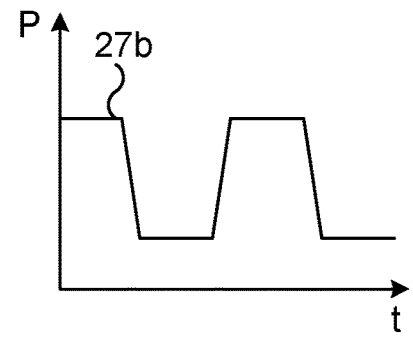

In FIG. 5B, a second reference power signature 27b is shown where the power goes from a high level to a low level, back to the high level and finally to the low level.

Figure 5C:
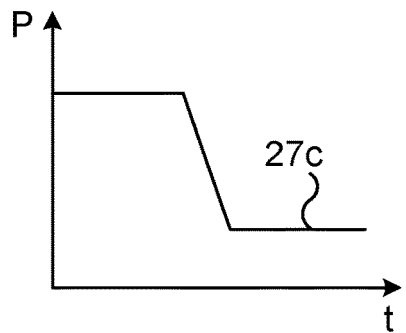

In FIG. 5C, a third reference power signature 27c is shown where the power goes from a high level to a low level.

Figure 5D:
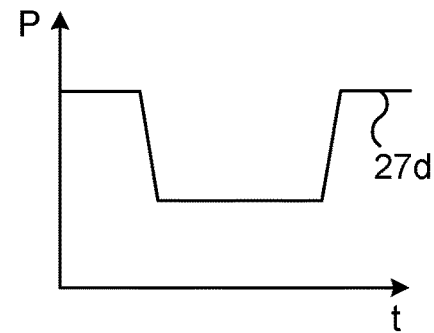

In FIG. 5D, a fourth reference power signature 27d is shown where the power goes from a high level to a low level and then back to the high level.

As explained in more detail below, the reference power signature can be applied on reference signals, on data symbols and/or on other signals which form part of a noise and/or interference signal for the wireless device.

When different remote radio heads are provided different reference power signatures, these are used for downlink transmissions at times which the wireless device perform measurements. The wireless device then sends a measurement report based on the measurements. In this way, the wireless device does not need to be modified to take advantage of the positioning of embodiments presented herein.

Optionally, the power signatures used are orthogonal to each other, allowing the contribution from each one of the power signatures to be extracted from a combines signal.

Figure 6A:
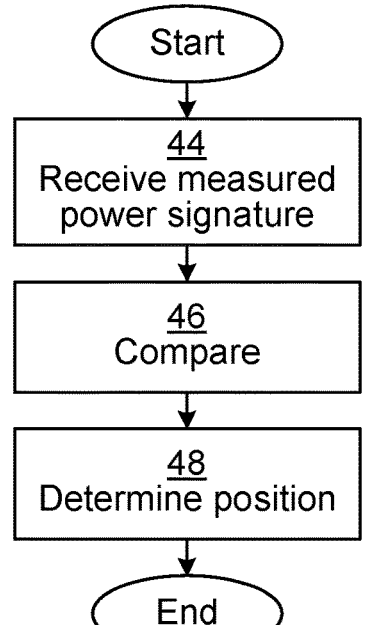
FIGS. 6A-B are flow charts illustrating embodiments of methods performed in a position determination node of FIG. 1 for determining a position of a wireless device.
Figure 6B:
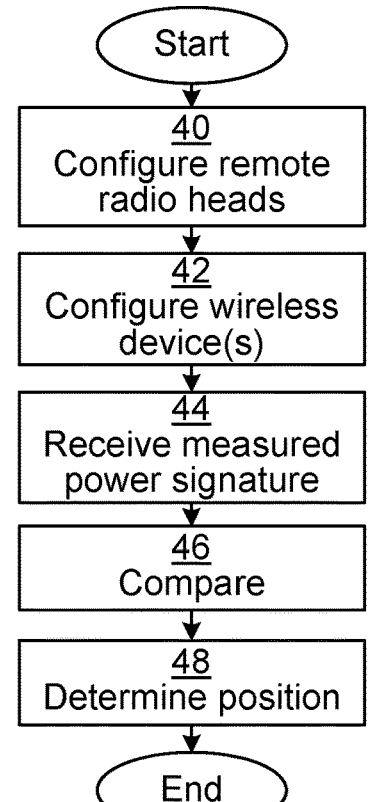

FIGS. 6A-B are flow charts illustrating embodiments of methods performed in a position determination node of FIG. 1 for determining a position of a wireless device. As shown e.g. in FIG. 1, the wireless device is located within a single radio cell served by a plurality of remote radio heads. In other words, the method is used to allow positioning of the wireless device when the remote radio heads are all part of the same radio cell, to provide a better positioning granularity than cell identifier. The method can e.g. be started when a request for a position of a specific wireless device is received from any other node. The method can be performed in parallel for several wireless devices if needed.

In a receive measured power signature step 44, a measured power signature is received. The measured power signature originates from the wireless device and can be received from the wireless device or via some intermediary node. The measured power signature comprises at least two, in time separated, power measurement values of a downlink signal. The measured power signature, when in the vicinity of a remote radio head applying a reference power signature, will reflect the reference power signature of that remote radio head. The measured power signature can e.g. be received in one or more measurement reports from the wireless device.

The measured power signature can be based on one or more various measurements, and can vary depending on the radio access technology which is used.

In one embodiment, each measurement can be based on a signal to noise and interference ratio (SINR). It is to be noted that the reference power signature does not need to imply a variation of the measured signal; instead, the reference power signature can imply a (pseudo-random) noise or interference applied with in accordance with the reference power signature. This is still distinguishable since SINR also varies with changes in noise and/or interference.

In one embodiment, each measurement is based on a total received wideband power observed by the wireless device from all sources.

In one embodiment, each measurement is based on a received signal code power.

In one embodiment, the measurements are performed on the downlink signal being a downlink pilot signal.

In a compare step 46, the measured power signature is compared with a set of reference power signatures. Each one of the plurality of remote radio heads is associated with a reference power signature. Furthermore, the reference power signatures differ for at least two of the plurality of remote radio heads to allow positioning. The comparison can occur over many instances of signatures, whereby even small differences in power can be detected in aggregation over time with great accuracy. The accuracy increases with the number of instances, but this also leads to the comparison taking a longer time. In other words, larger differences in power (such as between the high and low values of FIGS. 5A-D) in the reference power signature can be detected easier and thus requires less time, while smaller differences in power in the reference power signature need a longer time to be detected.

The reference power signatures can be assigned to remote radio heads in various ways. In one embodiment, each remote radio head within a cell can have a different reference power signature.

In another embodiment, each reference power signature is the same for at least two remote radio heads in the same area. For instance, the remote radio heads of each story of a building can share the same reference power signature. In this way the location of a wireless device can be determined to be on a particular floor of a building, without requiring unique reference power signatures for each remote radio head.

In one embodiment each measurement is based on a measurement of received quality and/or power of a reference signal such as RSRQ (Reference Signal Received Quality) and/or RSRP (Reference Signal Received Power). In such a case, each reference power signature defines transmission power for a corresponding reference signal. By using reference signals for the reference power signature, the power level of data symbols are not effected.

In one embodiment each, each measurement is based on a measurement of power of data symbols and wherein each reference power signature defines transmission power for corresponding data symbols. Data symbols is here to be interpreted as user data for the wireless device, i.e. part of the user plane. When there is not sufficient payload data to send at these occasions, dummy data can be used to ensure that the reference power signature is applied and forms a base for the measurements of the wireless device.

In a determine position step 48, a position is determined in that the wireless device is in the vicinity of one of the at least one remote radio head whose reference power signature best matches the measured power signature. By using a known position data of the remote radio head in question, an approximate position of the wireless device is thus obtain. The position data of each remote radio head, e.g. using longitude, latitude and optionally altitude, can be stored within the position determination node or externally.

Optionally, the position determination node 3 determines that the wireless device is in the vicinity of two specific remote radio heads by considering contributions from of a plurality of reference power signatures to the measured power signature. This can be expanded to three or more specific remote radio heads if the reference power signatures can be seen in the measurement power signature. When the reference power signatures are orthogonal, contributions from each reference power signature in the measured power signature can be extracted from a combined signal comprising contributions from several remote radio heads.

In one embodiment, a dominating reference power signature can be seen in the measured power signature. The contribution of the dominating reference power signature can then be subtracted from the measured power signature. Subsequently, the resulting measured power signature can be compared to the reference power signatures to evaluate if there is a second (less) dominating power signature. In such an embodiment, the power signatures do not need to be orthogonal.

Looking now to FIG. 6B, only new or modified steps compared to the method illustrated by the flow chart of FIG. 6A will be described.

In a configure remote radio heads step 40, each one of the plurality of remote radio heads is configured to use an assigned reference power signature.

When the measurements by the wireless device are performed on data symbols and not the reference signals, the radio base station can make sure that data is sent on these instances or otherwise transmit dummy data. The radio base station can, prior to this, also make sure that transmission of reference power signatures occurs and ensure these are present at times when the wireless device performs measurements.

In one embodiment, noise is added (as explained above), whereby the power levels of useful transmissions are kept unchanged. Still, such a pattern would be visible in reference reports comprising RSRQ values. Since these measurements are done on data symbols and not the reference signals, this depends on data being sent at the specific times; otherwise dummy data can be transmitted.

In a configure wireless device(s) step 42, one or more wireless devices currently in the radio cell is/are configured to periodically transmit the power measurement values of the downlink signal.

For instance, the wireless devices can be ordered to report current cell RSSI (Received Signal Strength Indicator) and/or RSRQ for a specific period and periodicity.

Optionally, the reference power signatures are orthogonal to each other. In this way, a contribution of each reference power signature can be obtained from a combined measured power signature.

Optionally, the wireless device is configured to store the power measurement values of the downlink signal and transmit them at a later time.

FIGS. 7A-C are schematic diagrams illustrating alternative embodiments of the position determination node 3 of FIG. 1, where the position determination node 3 is a separate node connected to the radio base station 7.

In FIG. 7A, the position determination node 3 is shown implemented as part of the radio base station 7.

In FIG. 7B, the position determination node 3 is shown implemented as part of an RNC 8. In W-CDMA, the RNC 8 already stores position data for each cell. This position data can be expanded to also hold position data for each remote radio head.

In FIG. 7C, the position determination node 3 is shown implemented as part of the core network 3. For instance, the position determination node 3 could in such an embodiment form part of a more extensive positioning node which can use different other positioning technologies (GPS, triangulation, cell ID) to obtain a position of wireless devices.

FIG. 8 is a schematic diagram showing some components of an embodiment of the position determination node 3 of FIG. 1 or FIGS. 7A-C. It is to be noted that when the position determination node 3 forms part of a host device (e.g. an RBS or an RNC), one or more of the components shown in FIG. 8 may be shared with the host device if appropriate.

A processor 60 is provided using any combination of one or more of a suitable central processing unit (CPU), multiprocessor, microcontroller, digital signal processor (DSP), application specific integrated circuit (ASIC) etc., capable of executing software instructions 66 stored in a memory 64, which can thus be a computer program product. The processor 60 can be configured to execute the methods described with reference to FIGS. 6A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 65 can be any combination of read and write memory (RAM) and read only memory (ROM). The data memory 65 may also comprise persistent storage, which, for example, can be any single one or combination of magnetic memory, optical memory, solid state memory or even remotely mounted memory. The data memory 65 can e.g. store reference power signatures and measured power signatures received from wireless devices to be used for positioning of the wireless device as described above.

The position determination node 3 further comprises an I/O interface 62 for communicating with other entities. Optionally, the I/O interface 62 also comprises a user interface for operator control of the position determination node 3.

Other components of the position determination node 3 are omitted in order not to obscure the concepts presented herein.

FIG. 9 is a schematic diagram showing functional modules of the software instructions of the position determination node 3 of FIG. 1, FIGS. 7A-C or FIG. 8 according to one embodiment. The modules are implemented using software instructions such as a computer program executing in the position determination node 3. The modules correspond to the steps in the methods illustrated in FIGS. 6A-B.

An RRH (Remote Radio Head) configurer 70 is configured to configure each one of the plurality of remote radio heads to use a reference power signature. This module corresponds to the configure remote radio heads step 40 of FIG. 6B.

A w.d. (Wireless Device) configurer 72 is configured to configure the wireless device to periodically transmit the power measurement values of the downlink signal. This module corresponds to the configure wireless device(s) step 42 of FIG. 6B.

A receiver 74 is configured to receive a measured power signature originating from the wireless device. This module corresponds to the receive measured power signature step 44 of FIGS. 6A-B.

A comparer 76 is configured to compare the measured power signature with a set of reference power signatures. This module corresponds to the compare step 46 of FIGS. 6A-B.

A position determiner 78 is configured to determine a position in that the wireless device is in the vicinity of one of the at least one remote radio head whose reference power signature best matches the measured power signature. This module corresponds to the determine position step 48 of FIGS. 6A-B.

FIG. 10 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 66 of FIG. 8.

While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method implemented by a position determination node for determining a position of a wireless device within a single radio cell served by a plurality of remote radio heads, the method comprising:
    receiving a measured power signature comprising at least two separated in time power measurement values of a downlink signal, the measured power signature originating from the wireless device;
    comparing the measured power signature with a set of reference power signatures, wherein each one of the plurality of remote radio heads is associated with a reference power signature and the reference power signatures differ for at least two of the plurality of remote radio heads; and
    determining a position of the wireless device as being in the vicinity of one of the at least one remote radio head whose reference power signature best matches the measured power signature.

2. The method of claim 1, wherein the reference power signatures differ for each one of the plurality of remote radio heads.

3. The method of claim 1, wherein each reference power signature is the same for at least two remote radio heads in the same area.

4. The method of claim 1, wherein in the receiving a measured power signature, each measurement is based on a signal to noise and interference ratio.

5. The method of claim 1, wherein:
in the receiving a measured power signature, each measurement is based on a measurement of received quality and/or power of a reference signal; and
wherein each reference power signature defines transmission power for a corresponding reference signal.

6. The method of claim 1, wherein:
in the receiving a measured power signature, each measurement is based on a measurement of power of data symbols; and
wherein each reference power signature defines transmission power for corresponding data symbols.

7. The method of claim 1, wherein in the receiving a measured power signature, each measurement is based on a total received wideband power observed by the wireless device from all sources.

8. The method of claim 1, wherein in the receiving a measured power signature, the downlink signal is a downlink pilot signal.

9. The method of claim 1, wherein in the receiving a measured power signature, each measurement is based on a received signal code power.

10. The method of claim 1, wherein the reference power signatures are orthogonal to each other.

11. The method of claim 1, wherein the determining a position comprises determining that the wireless device is in the vicinity of two specific remote radio heads by considering contributions from of a plurality of reference power signatures to the measured power signature.

12. The method of claim 1, further comprising configuring each one of the plurality of remote radio heads to use a reference power signature.

13. The method of claim 1, further comprising configuring the wireless device to periodically transmit the power measurement values of the downlink signal.

14. A position determination node for determining a position of a wireless device within a single radio cell served by a plurality of remote radio heads, the position determination node comprising:
processing circuitry;
memory containing instructions executable by the processing circuitry whereby the position determining node is operative to:
receive a measured power signature comprising at least two separated in time power measurement values of a downlink signal, the measured power signature originating from the wireless device;
compare the measured power signature with a set of reference power signatures, wherein each one of the plurality of remote radio heads is associated with a reference power signature and the reference power signatures differ for at least two of the plurality of remote radio heads; and
determine a position of the wireless device as being in the vicinity of one of the at least one remote radio head whose reference power signature best matches the measured power signature.

15. The position determination node of claim 14, wherein the reference power signatures differ for each one of the plurality of remote radio heads.

16. The position determination node of claim 14, wherein each reference power signature is the same for at least two remote radio heads in the same area.

17. The position determination node of claim 14, wherein each measurement is based on a signal to noise and interference ratio.

18. The position determination node of claim 14, wherein:
each measurement is based on a measurement of received quality and/or power of a reference signal; and
wherein each reference power signature defines transmission power for a corresponding reference signal.

19. The position determination node of claim 14, wherein:
each measurement is based on a measurement of power of data symbols; and
wherein each reference power signature defines transmission power for corresponding data symbols.

20. The position determination node of claim 14, wherein each measurement is based on a total received wideband power observed by the wireless device from all sources.

21. The position determination node of claim 14, wherein the downlink signal is a downlink pilot signal.

22. The position determination node of claim 14, wherein each measurement is based on a received signal code power.

23. The position determination node of claim 14, wherein the reference power signatures are orthogonal to each other.

24. The position determination node of claim 14, wherein the instructions are such that the position determination node is operative to determine that the wireless device is in the vicinity of two specific remote radio heads by considering contributions from of a plurality of reference power signatures to the measured power signature.

25. The position determination node of claim 14, wherein the instructions are such that the position determination node is operative to configure each one of the plurality of remote radio heads to use a reference power signature.

26. The position determination node of claim 14, wherein the instructions are such that the position determination node is operative to configure the wireless device to periodically transmit the power measurement values of the downlink signal.

27. A non-transitory computer readable recording medium storing a computer program product for determining a position of a wireless device within a single radio cell served by a plurality of remote radio heads, the computer program product comprising software instructions which, when run on processing circuitry of a position determining node, causes the position determining node to:
receive a measured power signature comprising at least two, in time separated, power measurement values of a downlink signal, the measured power signature originating from the wireless device;
compare the measured power signature with a set of reference power signatures, wherein each one of the plurality of remote radio heads is associated with a reference power signature and the reference power signatures differ for at least two of the plurality of remote radio heads; and
determine a position of the wireless device as being in the vicinity of one of the at least one remote radio head whose reference power signature best matches the measured power signature.

* * * * *